(12) United States Patent
Rajarajan et al.

(10) Patent No.: US 8,182,229 B2
(45) Date of Patent: May 22, 2012

(54) METHODS AND APPARATUS TO REPAIR A ROTOR DISK FOR A GAS TURBINE

(75) Inventors: Rathina Rajarajan, Bangalore (IN); Desai Tushar Sharadchandra, Bangalore (IN); Santhanagopalakrishnan Babu, Chennai (IN); Akkur Marigowda Satish, Bangalore (IN); Michael Byron Neikirk, Taylors, SC (US)

(73) Assignee: General Electric Company, Schenectady, NY (US)

( * ) Notice: Subject to any disclaimer, the term of this patent is extended or adjusted under 35 U.S.C. 154(b) by 1150 days.

(21) Appl. No.: 12/013,762

(22) Filed: Jan. 14, 2008

(65) Prior Publication Data

US 2009/0180885 A1    Jul. 16, 2009

(51) Int. Cl.
*F01D 5/32* (2006.01)
(52) U.S. Cl. .................. 416/220 R; 416/244 R; 416/248
(58) Field of Classification Search .............. 416/198 A, 416/204 A, 219 R, 220 R, 244 R, 248; 29/889.1, 29/889.021
See application file for complete search history.

(56) References Cited

U.S. PATENT DOCUMENTS

| 4,265,595 | A | * | 5/1981 | Bucy et al. | 416/220 R |
| 4,478,554 | A | * | 10/1984 | Surdi | 416/221 |
| 5,350,279 | A | * | 9/1994 | Prentice et al. | 416/220 R |
| 5,584,659 | A | * | 12/1996 | Schmidt | 416/221 |
| 5,720,596 | A | * | 2/1998 | Pepperman | 416/220 R |
| 6,520,742 | B1 | * | 2/2003 | Forrester et al. | 416/220 R |

OTHER PUBLICATIONS

First Office Action for Chinese Application No. 200910003326.9 issued on Oct. 20, 2011.

* cited by examiner

*Primary Examiner* — Igor Kershteyn
(74) *Attorney, Agent, or Firm* — Sutherland Asbill & Brennan LLP

(57) ABSTRACT

Embodiments of the invention can provide methods and apparatus to repair a rotor disk for a gas turbine. In one embodiment, a method to repair a rotor disk for a gas turbine is provided, wherein the rotor disk can include a base and at least one dovetail slot between a pair of dovetail walls. The method can include identifying one or more cracks on the base of the rotor disk, and removing one or more cracks by providing one or more fillets on the base of the rotor disk. Further, the method can include providing one or more conic cuts on the base of the rotor disk between the pair of dovetail walls of at least one dovetail slot.

12 Claims, 6 Drawing Sheets

METHODS AND APPARATUS TO REPAIR A ROTOR DISK FOR A GAS TURBINE

BACKGROUND OF THE INVENTION

1. Field of the Invention

The invention generally relates to a gas turbine, and more particularly, methods and apparatus to repair a rotor disk for a gas turbine.

2. Description of the Related Art

Generally, a compressor rotor wheel assembly of a gas turbine can include a rotor disk and a plurality of rotor blades. The rotor disk can be provided with a plurality of dovetail slots around its periphery and each of the plurality of rotor blades are provided with a dovetail. The dovetail of each of the plurality of rotor blades can be axially inserted in one of the plurality of dovetail slots of the rotor disk to complete the compressor rotor wheel assembly. In some instances, the application of such a compressor rotor wheel assembly is not limited to gas turbines. The compressor rotor wheel assembly can also be used in other power generation and thrust generation applications.

After the rotor disk is installed into the gas turbine, a forward side and an aft side can be defined according to the direction of flow of a working fluid. The working fluid in the gas turbine can enter from the forward side of the rotor disk and escapes from the aft side of the rotor disk. Further, each of the plurality of dovetail slots of the rotor disk can include a pair of dovetail walls and a base of the rotor disk. Each of the plurality of dovetail slots can include a plurality of acute corners located on the base of the rotor disk on the forward and the aft sides of the rotor disk.

During operational conditions, the high rotational speed of the rotor disk and/or thermal gradients can cause the plurality of acute corners to experience high tangential and radial stresses, which may cause an initiation of one or more cracks at the plurality of acute corners of the plurality of dovetail slots. Further, each crack may increase as the rotor disk is in operation.

Conventional methods for repairing a rotor disk for a gas turbine relate to cracks having a length of less than about 0.1 inches (2.5 mm). However, in case the length of a crack is greater than about 0.1 inches (2.5 mm), no repair option is defined, and the rotor disk may be scrapped.

Scrapping the rotor disk can directly increase the operational cost of a gas turbine due to the downtime and/or service time needed to disassemble the associated turbine and remove the rotor disk. In light of the above, there is need for a repair methodology of a rotor disk having one or more cracks with the length greater than about 0.1 inches. Furthermore, there exists a need for methods and apparatus to repair a rotor disk for a gas turbine.

BRIEF DESCRIPTION OF THE INVENTION

Some or all of the needs above can be addressed by embodiments of the invention. Embodiments of the invention can provide methods and apparatus to repair a rotor disk for a gas turbine. In one embodiment, a method is provided for repairing a rotor disk for a gas turbine, wherein the rotor disk can include a base and at least one dovetail slot between a pair of dovetail walls. In this embodiment, one or more cracks can be identified on the base of the rotor disk. The identified one or more cracks can be removed and one or more fillets can be provided on the base of the rotor disk. Further, one or more conic cuts can be provided on the base of the rotor disk between the pair of dovetail walls of the at least one dovetail slot.

In another embodiment of the invention, a method is provided which permits reuse of a rotor disk in a gas turbine. The method can include identifying one or more cracks having a length greater than about 0.1 inches (2.5 mm) and within about 0.25 inches (6.4 mm) on the base of a rotor disk. The identified one or more cracks can be removed from the base of the rotor disk and one or more fillets can be provided on the base. Radii of one or more fillets provided on the base can be about 0.1 inches (2.5 mm). Further, one or more conic cuts with a rho value (also called projective discriminant) less than about 0.5 can be provided between the pair of dovetail walls of the at least one dovetail slot. A depth of one or more conic cuts can be about 0.45 inches (11.4 mm) and the corresponding length of one or more conic cuts can be about 0.55 inches (14.0 mm) in dimension.

In another embodiment of the invention, an apparatus to repair a rotor disk for a gas turbine can be provided, wherein the rotor disk can include a base and at least one dovetail slot between a pair of dovetail walls. The apparatus can include one or more fillets on the base, wherein one or more cracks are removed from the base of the rotor disk. Further, one or more conic cuts can be provided on the rotor disk between the pair of dovetail walls of the at least one dovetail slot, wherein one or more conic cuts can include a rho less than about 0.5.

BRIEF DESCRIPTION OF THE DRAWINGS

Embodiments of the invention will now be discussed in more detail with reference, by way of example, to the accompanying drawings, in which.

DETAILED DESCRIPTION OF THE INVENTION

Figure 1:
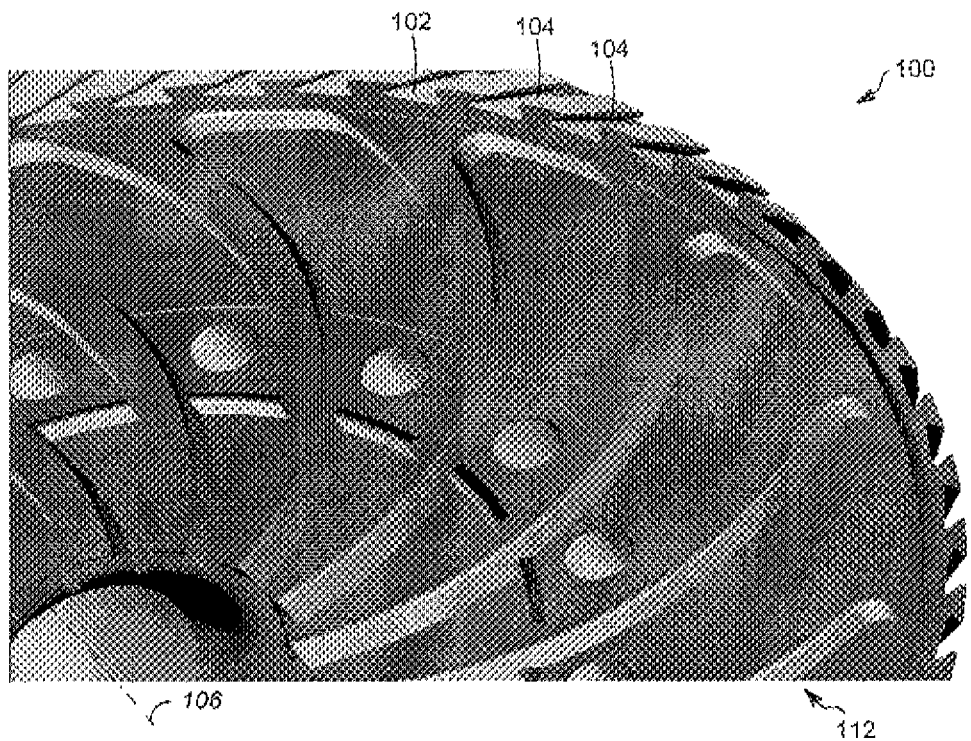
FIG. 1 illustrates a portion of an example rotor disk of a gas turbine.

FIG. 1 illustrates a portion of an example rotor disk 100 of a gas turbine. The rotor disk 100 can include a base 102 and at least one dovetail slot 104 for attaching a rotor blade. Typically, the rotor disk includes multiple rotor blades or an array of rotor blades. The rotor blades are provided with a respective dovetail, which can be axially inserted into the at least one dovetail slot 104 to fit the rotor blades in the rotor disk 100. During operation of the gas turbine, the rotor disk 100 can rotate about an axial direction 106. Further, the rotor disk 100 can include a forward side 112 and an aft side. In an aspect of the invention, a working fluid in a compressor rotor wheel assembly can enter an associated array of rotor blades from the forward side 112 of the rotor disk 100 and can escape from the array from the aft side of the rotor disk 100.

In an embodiment of the invention, the rotor disk 100 can be used in a compressor rotor wheel assembly of a gas turbine.

However, applications of a rotor disk 100, are not limited to a compressor rotor wheel assembly of a gas turbine, but can be used other applications such as in power generation and thrust generation.

Figure 2:
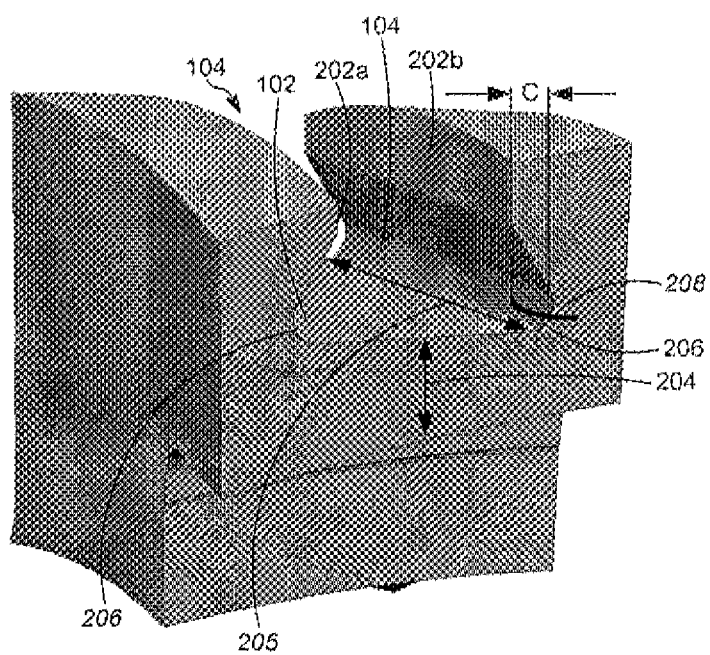
FIG. 2 is an example view of a at least one dovetail slot of the rotor disk of FIG. 1, and one or more example cracks at the base of the at least one dovetail slot.

FIG. 2 is an example view of at least one dovetail slot 104 of the rotor disk 100 shown in FIG. 1. Each of the dovetail slots 104 of the rotor disk 100 can include a pair of dovetail walls 202a and 202b. A portion of the base 102 of the rotor disk 100 can be seen in FIG. 2, wherein the base 102 can include a width 204 and depth 205. Each of the dovetail slots 104, thus can include a base portion which can collectively be known as the base 102. Further, the base 102 can extend along the circumference of the rotor disk 100. FIG. 2 also shows a plurality of acute corners 206 formed at the forward side 112 and the aft side where each pair of dovetail walls 202a and 202b can meet the base 102.

During operation of the rotor disk 100, the plurality of acute corners 206 may experience high tangential and radial stresses, which may cause one or more cracks, 208. Cracks 208 may appear after a certain number of operational cycles (start-up and/or rotation during operation) of the rotor disk 100. The number of operational cycles after which a crack 208 may begin to appear is known as crack initiation life. After the crack initiation life, a length 'C' of the crack 208 can continuously increase with the number of operational cycles and thus the length 'C' of the crack 208 may depend upon, or otherwise be based at least in part on the number of operational cycles occurring after the crack initiation life and before the inspection of the rotor disk 100 to identify the crack 208. In some instances, a length 'C' of a crack 208 may extend in one or more other directions, including upward, laterally, and downward.

Figure 3A:
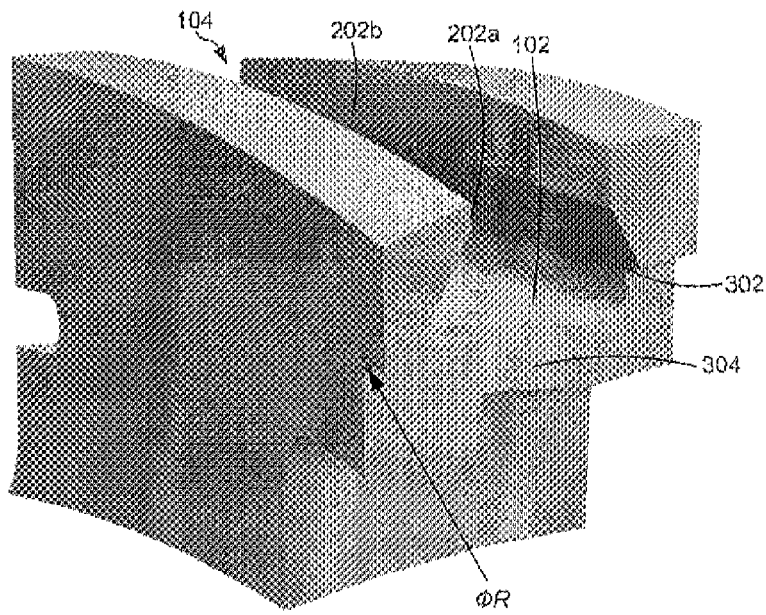
FIGS. 3a-3e are example views of the at least one dovetail slot with the one or more fillets and the one or more conic cuts on the rotor disk in accordance with an embodiment of the invention.
Figure 3B:
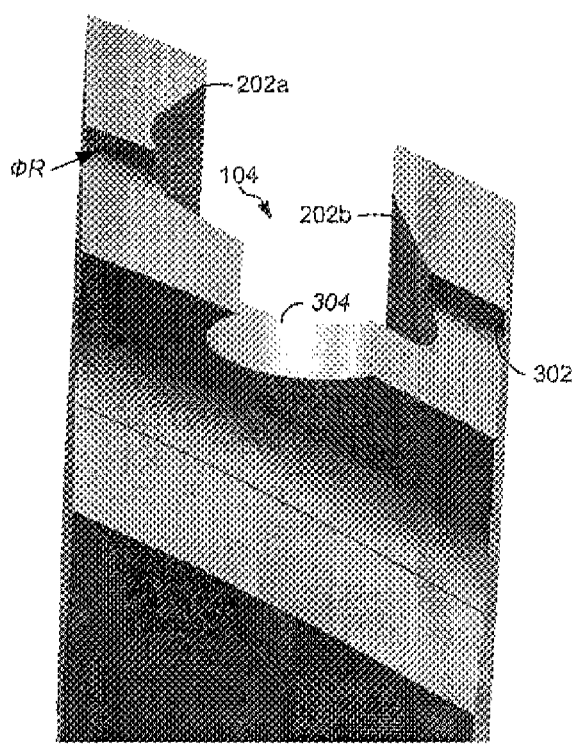
Figure 3C:
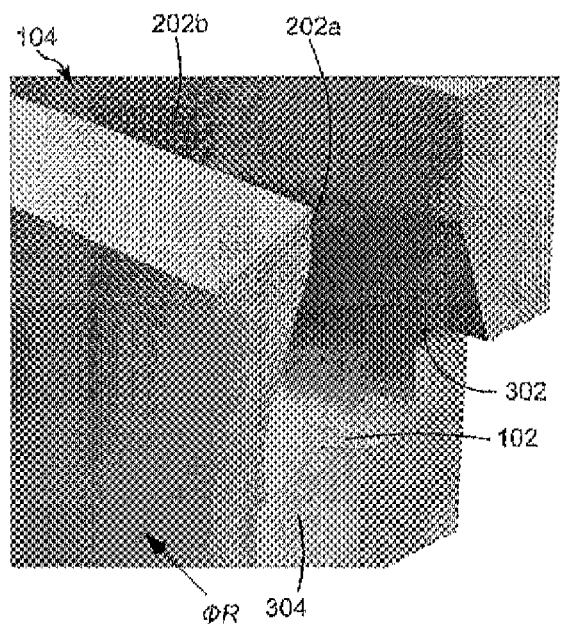
Figure 3D:
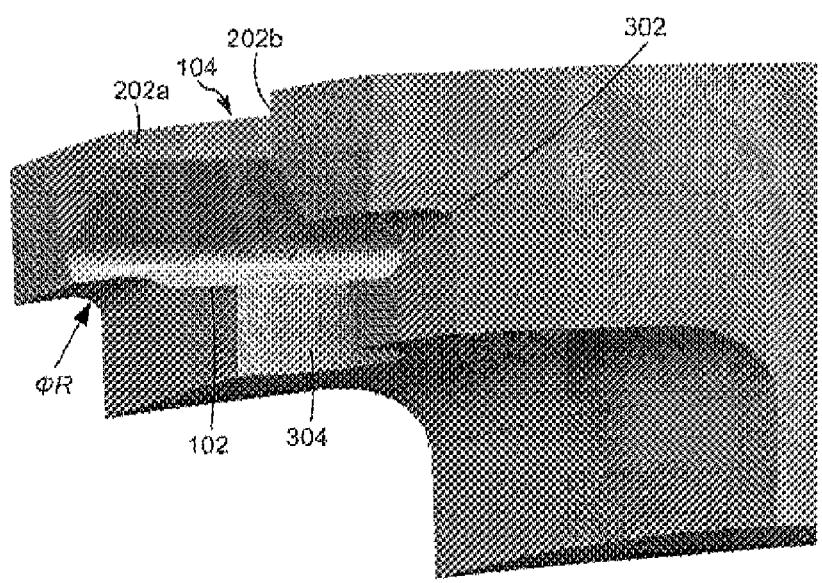
Figure 3E:
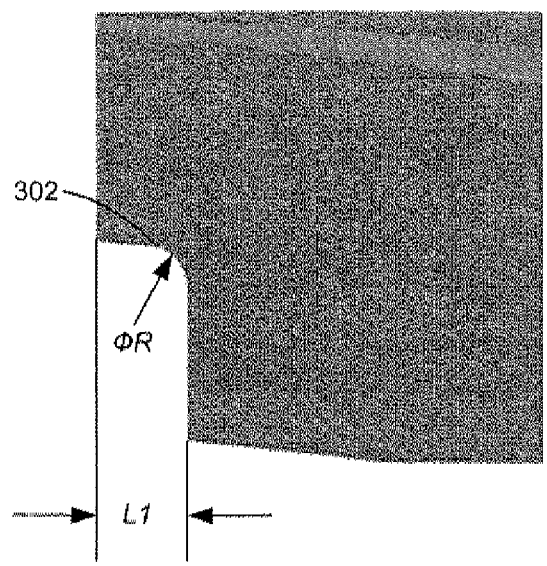

FIGS. 3a-3e are example views of a dovetail slot 104 with one or more fillets 302, and one or more conic cuts 304. FIG. 3e represents radii 'ΦR' and an axially extending depth 'L1' of at least one fillet 302. FIGS. 3b, 3c and 3d are example views of at least one dovetail slot 104 taken from different angles to illustrate an example shape of one or more fillets 302, and one or more conic cuts 304.

In an embodiment of the invention, a method is provided for repairing of a rotor disk 100 with the one or more cracks 208. In one aspect of the invention, one or more cracks 208 can be identified on a plurality of acute corners 206 of a forward side 112 of the base 102 of the rotor disk 100. Further, the length 'C' of the cracks 208 may be greater than about 0.1 inches (2.5 mm) and less than or otherwise within about 0.25 inches (6.4 mm). The phrase "about 0.25 inches (6.4 mm)" is intended to include dimensions up to about 0.30 inches (7.6 mm). In some instances, the length 'C' of the cracks 208 can extend in one or more directions, including upward, laterally, and downward. Subsequently, one or more cracks 208 can be removed across a portion of the width 204 and/or depth 205 of the base 102 on the forward side 112 of the rotor disk 100 to provide one or more fillets 302. One or more fillets 302 can be provided across the portion of the width 204 and/or depth 205 of the base 102 along the circumference of the rotor disk 100. In an aspect of the invention, one or more fillets 302 can generally be round shaped and providing one or more fillets 302 on the base 102 of the rotor disk 100 can include providing one or more fillets 302 with a radii 'ΦR' of about 0.1 inches (2.5 mm), and a depth 'L1' between about 0.1 inches (2.5 mm) to about 0.25 inches (6.4 mm). However the radii 'ΦR' and the depth 'L1' of one or more fillets 302 need not be limited to these values, as one can suitably select a radii 'ΦR' and a depth 'L1' of one or more fillets 302 as per the applications of a compressor rotor wheel assembly to remove cracks 208, in accordance with an embodiment of the invention. Further, one or more conic cuts 304 can be provided between the pair of dovetail walls 202a and 202b of the dovetail slot 104 on the forward side 112 of the base 102 of the rotor disk 100. In an aspect of the invention, one or more conic cuts 304 can be provided on both the forward side 112 and the aft side of the base 102 of the rotor disk 100. An example shape of one or more conic cuts 304 is explained and shown in detail with respect to FIGS. 4a-4b.

Figure 4A:
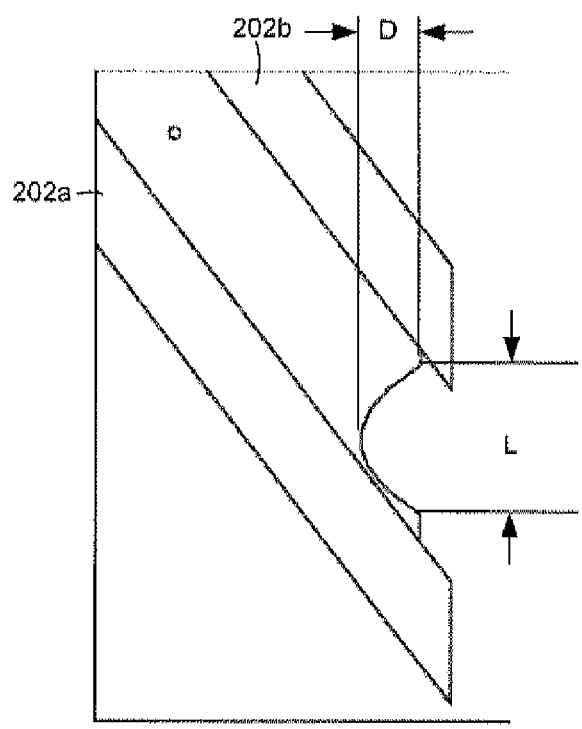
FIGS. 4a-4b illustrate an example geometry of the one or more conic cuts provided between the pair of dovetail walls of the at least one dovetail slot of the rotor disk in accordance with an embodiment of the invention.
Figure 4B:
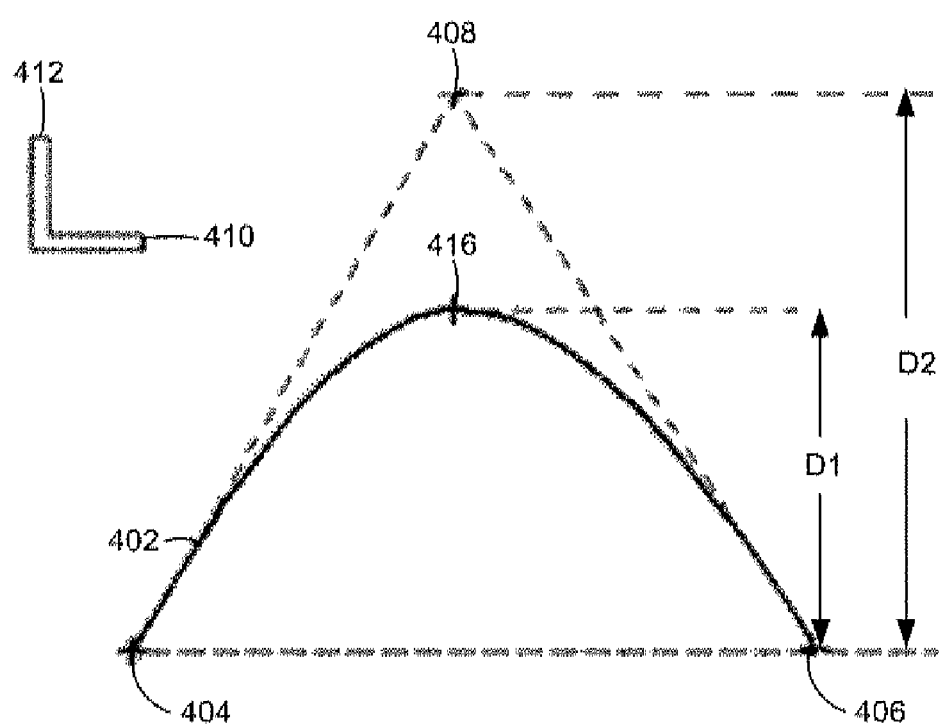

Referring now to FIGS. 4a-4b, an example geometry of one or more conic cuts 304 provided between a pair of dovetail walls 202a and 202b of at least one dovetail slot 104 of the rotor disk 100 is shown in accordance with an embodiment of the invention. FIG. 4a illustrates the top view of one or more conic cuts 304, and FIG. 4b illustrates the example geometry of one or more conic cuts 304. FIG. 4a also illustrates a depth 'D' and a length 'L' of one or more conic cuts 304. The solid line in FIG. 4b represents a conic curve 402 and the end points of the conic curve 402 are called a start edge curve 404 and an end edge curve 406. The respective dotted lines originating from the start edge curve 404 and the end edge curve 406 represent the tangents at these points and they meet at a point known as an apex curve 408. Further, the direction along the straight line joining the start edge curve 404 and the end edge curve 406 is called an x-axis 410 and the direction perpendicular to the x-axis 410 is called a y-axis 412. A distance D1 of a vertex 416 can be defined as the distance of the vertex 416 from the x-axis 410 along the y-axis 412. Also, a distance D2 can be defined as the distance of the apex curve 408 from the x-axis 410 along the y-axis 412. With these example parameters defined, the rho value, also known as a projective discriminant, can be defined as the ratio of the distance D1 to the distance D2. The rho value can be defined for conic shapes and can range in value between about 0 and about 1. In some instances, the rho value can signify an ellipse if it is less than about 0.5, a parabola if it is equal to about 0.5, and a hyperbola if it is more than about 0.5. In other embodiments, the rho value can range in value between about 0 and about 1.

In an aspect of the invention, providing one or more conic cuts 304 can include providing one or more conic cuts with an elliptical shape or similar geometry which corresponds to a rho value less than about 0.5 and maintaining a depth 'D' of about 0.45 inches (11.4 mm), and a length 'L' of about 0.55 inches (14.0 mm).

Referring back to FIGS. 3a-3e, another embodiment of the invention can include a method for repairing of a rotor disk 100 with one or more cracks 208, where one or more cracks 208 can be identified in a plurality of acute corners 206 of the forward side 112 of the base 102 of the rotor disk 100. Further, the length 'C' of the one or more cracks 208 can be greater than about 0.1 inches (2.5 mm) and within about 0.25 inches (6.4 mm). Subsequently, the one or more cracks 208 can be removed across a portion of the width 204 and/or depth 205 of the base 102 on the forward side 112 of the rotor disk 100 to provide one or more fillets 302 on the base 102 of the rotor disk 100. In an aspect of the invention, the radii 'ΦR' of one or more fillets can be about 0.1 inches (2.5 mm) and the depth 'L1' can be about 0.25 inches (6.4 mm). One or more fillets 302 can be provided across the portion of the width 204 or the depth 205 of the base 102, and along the circumference of the rotor disk 100.

In an aspect of the invention, one or more fillets 302 can be round shaped and providing one or more fillets 302 on the base 102 of the rotor disk 100 can include providing one or more fillets 302 with a radii 'ΦR' of about 0.1 inches (2.5 mm), and a depth 'L1' between about 0.1 inches (2.5 mm) to about 0.25 inches (6.4 mm). However the radii 'ΦR' and the depth 'L1' of one or more fillets 302, need not be limited to these values, as one can suitably select a radii 'ΦR' and a depth 'L1' of the one or more fillets 302 as per the applications of the compressor rotor wheel assembly to remove the one or more cracks 208 in accordance with an embodiment of the invention.

Further, one or more conic cuts 304 with an elliptical shape can be provided between the pair of dovetail walls 202a and 202b of at least one dovetail slot 104, on the forward side 112 of the base 102 of the rotor disk 100. In an aspect of the invention, one or more conic cuts can have a depth 'D' of about 0.45 inches (11.4 mm) and the length 'L' of about 0.55 inches (14.0 mm). In another aspect of the invention, one or more conic cuts 304 can be provided on both the forward side 112 and the aft side of the base 102 of the rotor disk 100. The method further can include installing the repaired rotor disk in the gas turbine.

Figure 5:
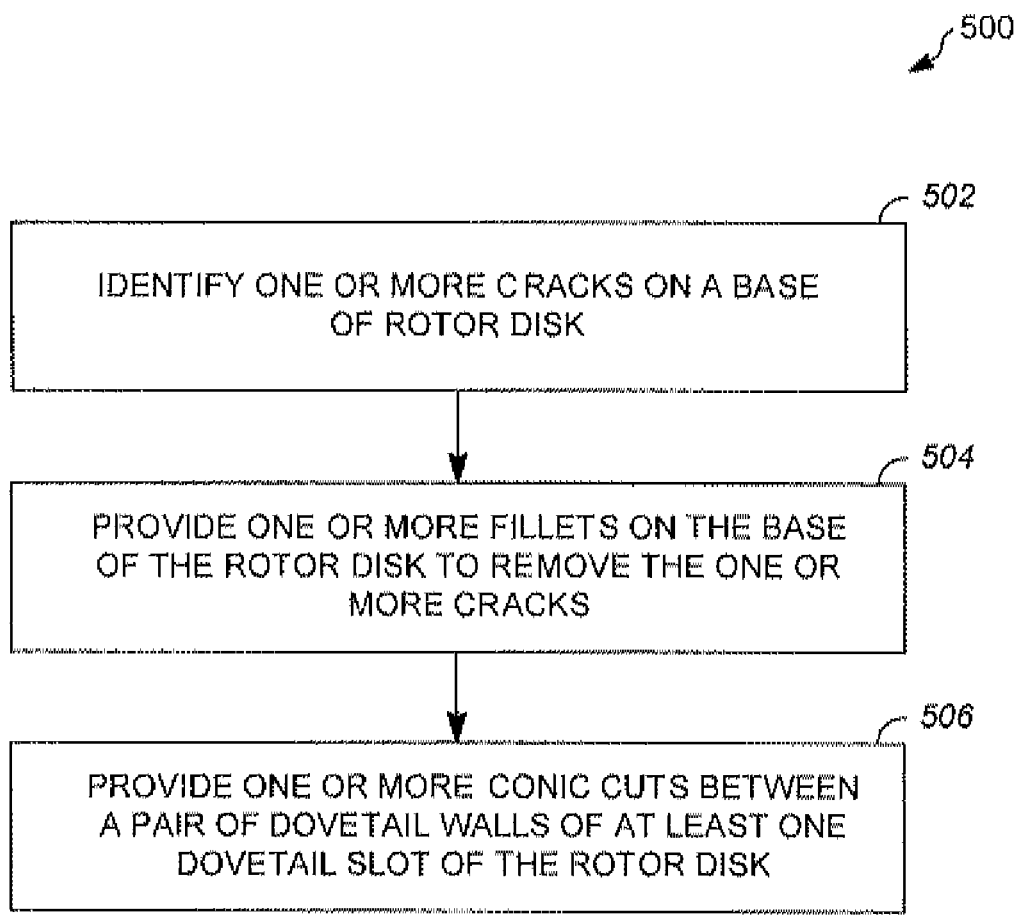
FIG. 5 illustrates an example method for repairing a rotor disk in accordance with an embodiment of the invention

FIG. 5 illustrates an example method for repairing a rotor disk in accordance with an embodiment of the invention. In the embodiment shown in FIG. 5, a method 500 for repairing a rotor disk for reuse in a gas turbine can be provided. The method 500 can begin at block 502, in which one or more cracks 208 are identified on a base 102 of a rotor disk 100. The length 'C' of one or more cracks 208 can be greater than about 0.1 inches (2.5 mm) and within about 0.25 inches (6.4 mm). In one aspect of the invention, the cracks can be identified on at least a forward side 112 or the aft side of the base 102 of the rotor disk 100.

Block 502 is followed by block 504, in which one or more fillets 302 can be provided on the base 102 of the rotor disk 100 to remove one or more cracks 208.

In an aspect of the invention, one or more fillets 302 can be provided across a portion of the width 204 or depth 205 of the base 102, and along the circumference of the rotor disk 100. In another aspect of the invention, one or more fillets 302 can be round shaped, and providing one or more fillets 302 on the base 102 of the rotor disk 100 can include providing one or more fillets 302 with a radii 'ΦR' of about 0.1 inches (2.5 mm), and a depth 'L1' between about 0.1 inches (2.5 mm) to about 0.25 inches (6.4 mm). However the radii 'ΦR' and the depth 'L1' of the one or more fillets 302 is not limited to these values, as one can suitably select a radii 'R' and a depth 'L1' of the one or more fillets 302 as per the applications of the compressor rotor wheel assembly to remove the one or more cracks 208 in accordance with an embodiment of the invention.

Block 504 is followed by block 506, in which one or more conic cuts 304 can be provided between a pair of dovetail walls 202a and 202b in at least one dovetail slot of the rotor disk 100. One or more conic cuts 304 can be provided between the pair of dovetail walls 202a and 202b on at least the aft side or the forward side 112 of the base 102 of the rotor disk 100 to facilitate or otherwise cause a relaxation of some or all of the tangential and/or radial stresses at some or all of the plurality of acute corners 206 of at least one dovetail slot 104. Relatively high stress values may adversely affect the life of the rotor disk 100 for use in service. Relatively lower stress values may increase the life of the rotor disk 100. The crack initiation life is one measure of the life of the rotor disk 100. Therefore relaxation of some or all of the stresses can cause the crack initiation life of the rotor disk 100 to improve and scrapping of the rotor disk 100 with one or cracks 208 may be avoided or otherwise minimized.

In an aspect of the invention, one or more conic cuts 304 between a pair of dovetail walls 202a and 202b can include a depth 'D' of about 0.45 inches (11.4 mm), and a length 'L' of about 0.55 inches (14.0 mm). However the depth 'D' and the length 'L' of tone or more conic cuts 304, are not limited to these values, since one can suitably select a depth 'D' and a length 'L' of the one or more conic cuts 304 as per the applications of the compressor rotor wheel assembly in accordance with an embodiment of the invention. To define the geometry of the one or more conic cuts 304, a rho value also called projective discriminant can be selected. The method of providing the one or more conic cuts 304 can include maintaining a rho (projective discriminant) value of the shape or geometry of the cut to be less than about 0.5 and thereby controlling or otherwise determining the geometry of the one or more conic cuts 304 to be elliptically shaped.

The method 500 ends after block 506. In other embodiments, an example method can have fewer or greater elements, which may be performed in a similar or different sequence than described above.

In an embodiment of the invention, a method of reusing a repaired rotor disk with one or more fillets 302 and one or more conic cuts 304 is provided. After repairing the rotor disk 100, the rotor disk 100 can be installed in a gas turbine. In some instances, the repair can be performed off site from the associated gas turbine and thus some or all transportation cost of the rotor disk 100 may be minimized. The one or more conic cuts 304 can be provided in the repaired rotor disk 100, which may reduce some or all tangential and/or radial stresses during operational or cold start conditions, which in turn can improve the crack initiation life of one or more cracks 208 at some or all of the plurality of acute corners 206 of at least one dovetail slot 104. Embodiments of the invention provided are not limited to the repair method of the rotor disk of the gas turbine. One may recognize the applicability of the repair methodology applied to a rotor disk 100 with the at least one dovetail slot 104 can be applied in many similar rotor applications including power generation and thrust generation. Aspects of the invention can include the reduction of scrapping of a rotor disk with one or more cracks at a plurality of corners. Furthermore, a repair process in accordance with an embodiment of the invention may be relatively easy to implement at an installation or a customer site.

The foregoing written description uses examples to describe various embodiments of the invention. It will be recognized by those skilled in the art that changes may be made in the above described embodiments without departing from the concepts thereof. The invention is not limited to the particular embodiments disclosed, but is intended to cover all modifications within the scope of the application.

The claimed invention is:

1. A method for repairing a rotor disk for a gas turbine, wherein the rotor disk comprises a base and at least one dovetail slot between a pair of dovetail walls, the method comprising:
   identifying one or more cracks on the base of the rotor disk;
   providing one or more fillets on the base of the rotor disk by removing the one or more cracks; and
   providing one or more conic cuts between the pair of dovetail walls of at least one dovetail slot.

2. The method of claim 1, further comprising installing the repaired rotor disk in the gas turbine.

3. The method of claim 1, wherein identifying one or more cracks comprises identifying one or more cracks with a length greater than about 0.1 inches and within about 0.25 inches.

4. The method of claim 1, wherein providing one or more fillets comprises removing one or more cracks across a portion of the width or depth of the base on an aft side of the rotor disk.

5. The method of claim 1, wherein providing one or more fillets comprises removing one or more cracks across a portion of the width or depth of the base on a forward side of the rotor disk.

6. The method of claim 1, wherein providing one or more fillets comprises providing one or more fillets with a radii of about 0.1 inches and a depth greater than about 0.1 inches and within about 0.25 inches.

7. The method of claim 1, wherein providing one or more conic cuts comprises providing one or more conic cuts on an aft side of the rotor disk.

8. The method of claim 1, wherein providing one or more conic cuts comprises providing one or more conic cuts on a forward side of the rotor disk.

9. The method of claim 1, wherein providing one or more conic cuts comprises providing one or more conic cuts with a rho value less than about 0.5.

10. The method of claim 1, wherein providing one or more conic cuts comprises providing one or more conic cuts with a depth between about 0.05 to about 0.45 inches, and a length between about 0.05 to about 0.55 inches.

11. A method for reusing a rotor disk for a gas turbine, the rotor disk comprising a base and at least one dovetail slot between a pair of dovetail walls, the method comprising:
   identifying one or more cracks with a length greater than about 0.1 inches and within about 0.25 inches on the base;
   providing one or more fillets on a forward or aft side of the base by removing the one or more cracks across a portion of a width or depth of the base of the rotor disk, wherein the one or more fillets comprise a radii of about 0.1 inches; and
   providing one or more conic cuts on the forward or aft side of the rotor disk and between the pair of dovetail walls of the at least one dovetail slot, wherein the one or more conic cuts comprise a rho value less than about 0.5.

12. The method of claim 11, further comprising:
   installing the repaired rotor disk in a gas turbine.

* * * * *